United States Patent [19]

Burrowes et al.

[11] Patent Number: 4,587,513

[45] Date of Patent: May 6, 1986

[54] NONCONTACT SHAFT ANGLE DETECTOR

[75] Inventors: David E. Burrowes; Alan W. Holmes; Daniel R. Valentine, all of Dayton, Ohio

[73] Assignee: Energy Innovations, Inc., Dayton, Ohio

[21] Appl. No.: 624,156

[22] Filed: Jun. 25, 1984

[51] Int. Cl.$^4$ ............................................. H03M 7/00
[52] U.S. Cl. ......................... 340/347 P; 250/231 SE; 340/347 M
[58] Field of Search ....................... 347/347 P, 347 M; 250/231 SE

[56] References Cited

U.S. PATENT DOCUMENTS

| | | | |
|---|---|---|---|
| 3,603,688 | 9/1971 | Smith-Vaniz | 356/172 |
| 3,918,814 | 11/1975 | Weiser | 356/156 |
| 4,320,293 | 3/1982 | Guretzky | 250/231 SE |
| 4,321,531 | 3/1982 | Marshall | 324/142 |
| 4,327,362 | 4/1982 | Hoss | 340/870.02 |
| 4,421,980 | 12/1983 | Kühhe | 340/347 P |

Primary Examiner—William M. Shoop, Jr.
Assistant Examiner—Saul M. Bergmann
Attorney, Agent, or Firm—Robert R. Jackson; W. Edward Bailey

[57] ABSTRACT

Apparatus and method for non-contact determination of shaft angle utilizes a patterned disc secured to the shaft or other rotor being observed. The disc has sectors of different optical properties whereby radiant energy directed to the disc will be encoded by the sectored pattern. A set of detectors, which each correspond to one of the sectors, provides variable output signals according to the amount of radiant energy attenuated by the disc and directed onto the detectors. These signals are converted to a set of digital signals which define a unique rotational position, and a computing means calculates angular position from these signals. The computing means will, if necessary, compare the digital output signals and then calculate angular position in a manner which is insensitive to small decenters (or lack of concentricity) in the arrangement of the shaft, disc, detectors, and any associated optical system.

5 Claims, 2 Drawing Figures

NONCONTACT SHAFT ANGLE DETECTOR

BACKGROUND OF THE INVENTION

This invention relates to apparatus and method for noncontact optical measurement of the angular position of a shaft or like element supported to rotate about a predetermined axis. Various types of mechanism are known for this general purpose, but they have limitations due to concentricity and resolution requirements, complexity, expense, or reliability.

Typical of prior art devices are drums or discs affixed to the shaft in question and carrying magnetic or optical "marks" which define some increment of shaft angle. Higher resolution requires a larger number of marks, and as this number increases it becomes necessary to either increase the radius of the drum or disc to maintain a readable separation of the marks, or to make the marks smaller and the construction of the optical or magnetic readouts more precise. Some devices use a single circle of such marks together with some index or "0 angle" indicator; the detecting mechanism simply counts the number of marks as the shaft rotates from zero position to determine the shaft angle. An interruption of device power may cause the counting system to lose track of the total count, or angle. An absolute angle indication can be obtained if each mark is replaced by a unique code word. However, the size of such code words determines the resolution, and the larger the word, the more constraints are placed upon construction tolerances, leading to more complexity, closer tolerances, and more expensive devices.

An optical rotor rotation sensing system for reading out power consumption values from a watthour meter is disclosed in U.S. Pat. No. 4,327,362 issued Apr. 27, 1982 to Robert J. Hoss. This system provides the rotor of the meter with a surface which is light reflective over 180° and light absorbtive over the remainder. Light from an LED driven from an AC signal is directed to this surface of the rotor through an optical fibre cable and reflected light is transmitted through another optical fibre cable to a photodetector. The resultant pulses are counted and stored in the counter for later transmission to a remote monitoring site.

An angle-position transducer system of a direct reading analog-to-digital type is disclosed in U.S. Pat. No. 4,320,293 issued Mar. 16, 1982 to Harold Guretzky. There a source of light which provides a thin "line" of light, preferably from a laser source, is directed transversely to a transparent angle-shaped opening arranged around the surface of a drum carried on the shaft being monitored. A photodetector mounted on the opposite side of the drum from the light source receives a variable amount of light according to the shaft rotation, and the resulting variable voltage signal is converted to a digital signal which is used to drive a digital indicator.

U.S. Pat. No. 3,918,814 issued Nov. 11, 1975 to Sidney Weiser, discloses an optical position sensor in which a beam of light is collimated and directed by an optical fibre cable through the center of a four quadrant photodetector (quad detector), through a lens and onto a target having a regular target area of uniform reflectivity. Reflected light returns though the lens to the quad detector, and the resultant output voltage from each quadrant bears a direct relationship to the displacement of the target image along either the x or y axis, while z axis measurements can be achieved with a more complex detector and circuit. However there is no provision for determining displacement in rotation, and the required uniform reflectivity of the target area will preclude such a measurement.

SUMMARY OF THE INVENTION

The present invention consists of apparatus and a method for noncontact optical measurement of the rotation of a shaft. A pattern of varying optical reflectivity is either printed onto the end of the shaft, or onto a small disc which is then attached to the shaft. An optical system projects an image of this pattern onto a sectored detector sensitive to the variations in the optical reflectivity of the pattern. The output signals from each sector of the detector can be analyzed to determine the angle of the pattern relative to the detector. The pattern can be illuminated by either ambient light or a radiation source contained within the package. The pattern could be comprised of areas of differing optical transmission, and backlit.

A simple form of this invention utilizes a circular pattern which is divided into equal sized semi-circular areas of high and low reflectivity, and a "quad" detector which is comprised of 4 equal size quadrants of a circle. The reponsivity of the detector quadrants can be adjusted in different wavelength regions to improve the contrast of the target pattern, or to reject contaminating radiation sources.

For example, in some applications visible radiation from the sun or flickering fluorescent tubes can perturb the detector readings. In these cases an infrared filter in front of the detector will eliminate most of this clutter radiation, and still pass the radiation produced by an infrared LED. The LED output can be pulsed to further discriminate its radiation from natural sources.

In constructing apparatus according to the invention the concentricity of the disc and the center of the quad detector may be easily controlled, and "off axis" reading may not present any particular problem. However, in those applications where such concentricity is difficult to control, the invention includes a feature which reduces error introduced by such lack of concentricity. This feature is described in connection with the readout and analysis of the signals from the segments of the quad detector.

Radiant energy attenuated by the different parts of the disc is directed or focused onto the four elements of the quad detector by a simple optical system. In addition to sharpening the image observed by the detector, and collecting more radiation, this also allows enlargement or reduction of the image for applications where a very small or very large disc might be necessary because of size or space limitations. Each segment of the quad detector is an independent photodetector having an output which is proportional to the amount of radiant energy to which it is exposed within its wavelength region of responsivity. Each of these output signals is directed to an appropriate electronic amplifier, and the amplifier outputs are connected into analog to digital converters.

At the converter outputs there are, accordingly, a set of separate digital output signals which define the angular position of the disc, and therefore of the shaft to which the disc is attached. These digital output signals are directed to a processor device, preferably a microprocessor. The microprocessor in turn calculates the shaft angle which corresponds to that particular set of digital signals.

In the event exact concentricity of the shaft axis, the disc, the optical system, and the quad detector center is not readily attainable, the microprocessor angle computation algorithm can compensate for modest amounts of decenter. This capability is of particular value in situations where the position of the shaft axis may shift during rotation, or where it is costly to achieve concentricity of the disc on the shaft, or of the shaft/disc assembly to the quad detector and optical system assembly.

The primary object of the invention, therefore, is to provide apparatus and a method for noncontact optical measurement of the angular position of a member, such as a shaft, by encoding radiant energy with a reflective or transparent pattern fixed to the member, and sensing the encoded radiant energy with an optical system in conjunction with a sectored detector, which provides different analog output signals for different portions of the pattern then converting those signals to digital signals from which the angular position of the member is calculated; to provide such an apparatus and method wherein the digital signals can be processed to compensate for lack of concentricity; to provide such an apparatus and method in which ambient radiant energy may be used, or a source of radiant energy of selected wavelength, as in the invisible range, may be used with an appropriate sensor to avoid interference with readings; and to provide such an apparatus and method capable of rapid, repeated, and accurate readings which can be converted into various selected forms of angular expression and can be displayed and/or recorded as desired.

Other objects and advantages of the invention will be apparent from the following description, the accompanying drawings and the appended claims.

DESCRIPTION OF THE PREFERRED EMBODIMENT

Figure 1:
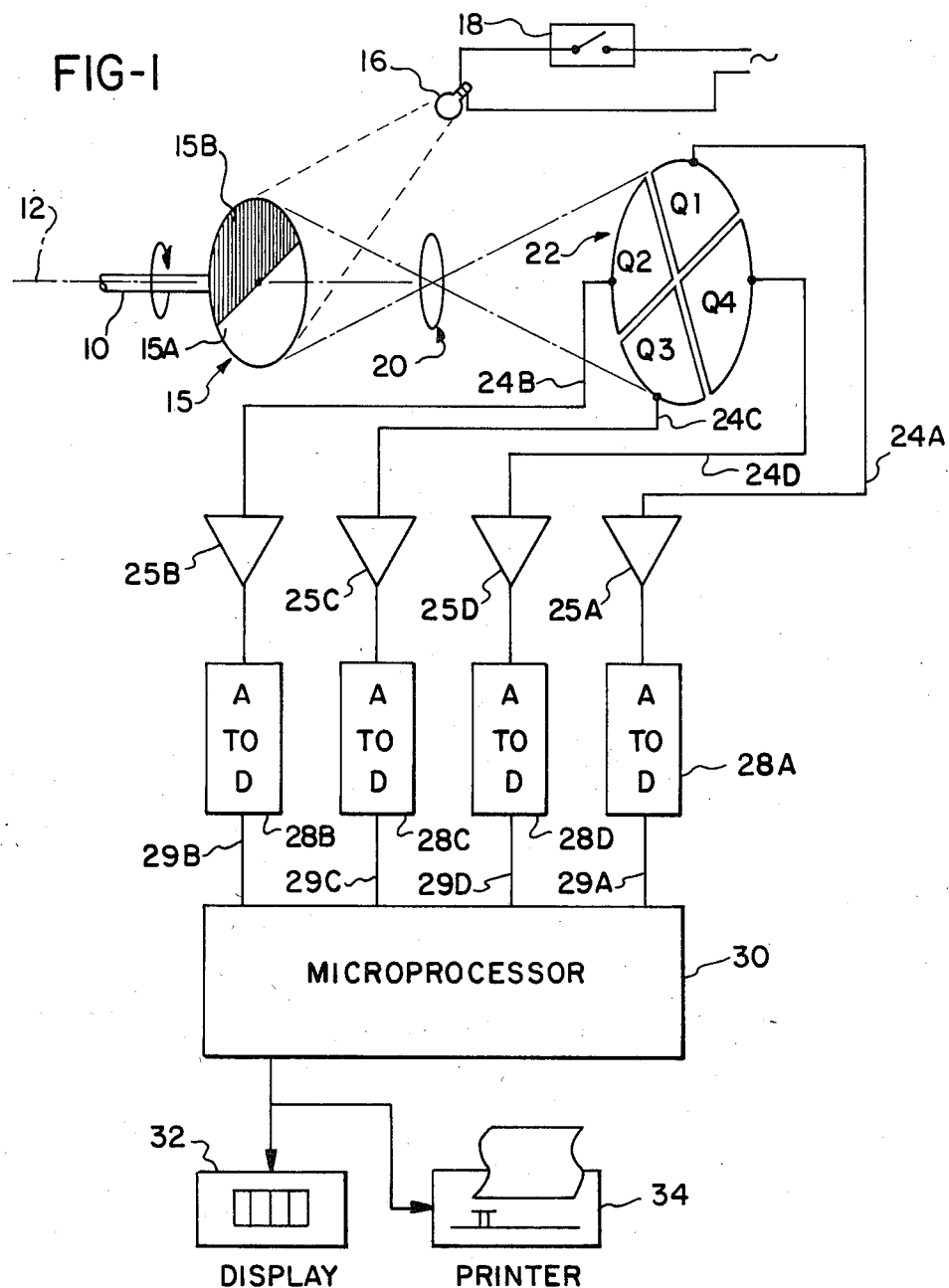
FIG. 1 a schematic drawing of an apparatus provided in accordance with the invention.

Referring to FIG. 1, a rotatable member is represented by the shaft 10 which is supported for rotation about an axis 12. It is desired to determine accurately the angular position of this shaft. In accordance with the invention a small disc 15 is fixed to the shaft 10. The disc pattern is divided in half, as shown, by having two separate areas 15A and 15B of different optical properties, such that each will attenuate radiant energy directed thereon (or through) in a distinctly different manner. This may be achieved in any suitable manner, as by constructing the disc of different halves, or appropriately coating its surface, to obtain the desired result. In one successful embodiment constructed according to the invention, the disc is provided with suitable coatings which make one half of its surface reflective and the other half absorptive. It should be noted that each of the different halves of the disc covers two quadrants of the disc surface.

Figure 2:
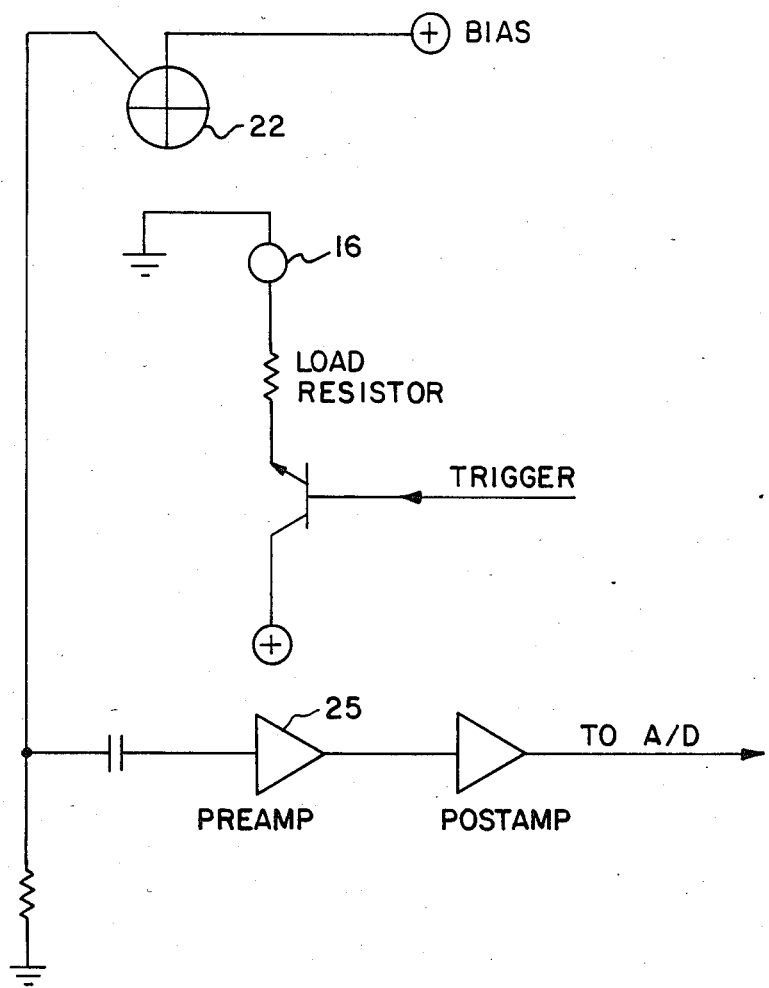
FIG. 2 a circuit diagram showing details of one segment of the quad detector, its power supply and its output amplifier, and a controllable LED source of radiant energy.

The disc is described as "fixed" to the member or shaft under observation, but it should be understood that such fixation may be of a temporary nature, for example when using the invention in testing or assembling operations. However, the fixing of the disc to the shaft, even if temporary, is tight enough that the two rotate together. The surface of the disc is uniformly flooded with radiant energy of desired wavelength. In some uses, this may simply be ambient light (daylight or artificial) if such wavelengths are satisfactory. Where it is desired to minimize optical interference from ambient light, it is useful to utilize a source of radiant energy in the invisible part of the spectrum, e.g. infrared light, and this is illustrated in FIG. 1 as an infrared LED (light emitting diode) 16 which is connected to a suitable power source via an electronic switch 18. Details of a suitable circuit are shown in FIG. 2. The trigger input to the switch 18 provides a way to control or "strobe" the light output of the LED for timing purposes and to discriminate the LED output from slowly varying natural radiation sources.

The radiant energy from the LED light source is reflected differently by the two different parts 15A and 15B of the disc, and the encoded energy is directed through a simple lens system 20 which focuses an image (inverted and reversed) onto the quad detector 22. This is a commercially available device which is available with different response characteristics, in this case being responsive to a range of intensity of infrared light as emitted from the LED. Detector 22 is comprised of four photodetector elements Q1, Q2, Q3, and Q4, each of which has a distinct output signal line 24A, 24B, 24C, and 24D which lead to individual electronic amplifiers 25A, 25B, 25C, and 25D. The power supply and amplifier circuit for one element Q4 is shown in FIG. 2. The amplified output signals thus are an analog representation of the quantity of radiant energy directed to the respective quadrant elements of the sensor 22.

The outputs of each amplifier are connected to the inputs of conventional analog-to-digital (A to D) converter circuits 28A, 28B, 28C, and 28D which generate four digital outputs on their outputs 29A, 29B, 29C, and 29D. This group or set of digital words defines a specific angular position of disc 15, and thus shaft 10, with respect to the fixed position of sensor 22. Expressed another way, in the illustration angle 0° is a vector from the center of the detector extending between the segments Q1 and Q4 and the corresponding shaft angle 0° locates the disc with the line between the sections 15A and 15B extending horizontally and the section 15B at the top, whereby there is maximum illumination of the segments Q1 and Q2 and minimum illumination of segments Q3 and Q4.

A set of digital words is thus transmitted for each reading to apparatus for converting this information into an angular representation or expression. A preferred apparatus for this purpose is a microcomputer 30. In one successful embodiment of the invention a Commodore 64 (TM) unit with a 6502 microprocessor is used. The angular representation which it calculates can be used to drive a conventional display device 32, and/or the representation can be recorded by a suitable printer 34.

Assuming the location of angle 0° as previously explained, the output signals from segments Q1 and Q2 will be the maximum, i.e. corresponding to full radiant energy thereon, and the output signals from segments Q3 and Q4 will be minimum, i.e. the least amount of reflection possible; note that this assumes an inversion and a side-to-side reversal of the radiant light image by the lens. It follows that, proceeding clockwise as the sensor is shown in FIG. 1, angle 90° will have Q1 and Q4 at full or maximum signal, at 180° Q4 and Q3 will be at full signal, and at 270° Q3 and Q2 will be at full signal.

The signal outputs S1, S2, S3 and S4 from the four quadrants of the detector can be translated into an angle by using the following sequence of mathematical operations (uniform illumination of the pattern and identical sensitivity of each detector quadrant is assumed for simplicity).

First, form the intermediate sums:

$$A1 = S1 + S4$$

$$A2 = S2 + S1$$

$$A3 = S3 + S2$$

$$A4 = S4 + S3$$

$$SUM = 2(S1 + S2 + S3 + S4)$$

Next, locate the quadrant Q which contains a line bisecting the image of the pattern into two equal halves and that is an illuminated quadrant:

If $A2 \geq A4$ and $A3 < A1$, then $Q = 1$
If $A2 \geq A4$ and $A3 \geq A1$, then $Q = 2$
If $A2 < A4$ and $A3 \geq A1$, then $Q = 3$
If $A2 < A4$ and $A3 < A1$, then $Q = 4$ Finally, find the angle using the correct equation for the proper quadrant:

Quadrant 1 ($Q = 1$)

$$\text{Angle} = \frac{(SUM/4 - S2 - S1)}{(S3 - S1)} \cdot 90°$$

$Q = 2$ $$\text{Angle} = \frac{(SUM/4 - S3 - S2)}{(S4 - S2)} \cdot 90° + 90°$$

$Q = 3$ $$\text{Angle} = \frac{(SUM/4 - S4 - S3)}{(S1 - S3)} \cdot 90° + 180°$$

$Q = 4$ $$\text{Angle} = \frac{(SUM/4 - S1 - S4)}{(S2 - S4)} \cdot 90° + 270°$$

For example, if:

$S1 = 70 \quad S2 = 100 \quad S3 = 30 \quad S4 = 0$
then:
$A1 = 70 \quad A2 = 170 \quad A3 = 130 \quad A4 = 30$
$SUM = 400$ Since $A2 > A4$ and $A3 > A1$, then $Q = 2$ and the bisector pointer is located in the second quadrant.
The angle is therefore:

$$\text{Angle} = \frac{(100 - 30 - 100)}{-100} \cdot 90 + 90°$$

$$= 117°$$

This analysis technique is insensitive to small decenters of the pattern image on the quad detector since it finds the bisector of the energy distribution.

Following are the program listings in Microsoft Basic for the Commodore 64 microcomputer to determine degrees of rotation of the disk:

```
4010 REM * READ ENCODER *
4020 REM
4025 FOR J=1 TO 2 : RR=0 : FOR P=1 TO 4 STEP 1
4030 POKE EN+P-1,0 :Q(P)=PEEK(EN) :NEXT
4045 FOR P=1TO4 :IF ABS(QW(P)-Q(P)) > SR THEN RR=1
4055 NEXT :FOR P=1TO4 :QW(P)=Q(P) :NEXT
4060 NEXT J :IF RR=1 THEN 4025: REM WAIT FOR STABLE READING
4070 FORP=1TO4:Q(P)=(MO-Q(P))/H(P):NEXT
4080 GOSUB4500 :AN=360-AN
4100 : IF WRK <>0 THEN AI=AN :RO=0 : RETURN
:REM STORE INIT ON ODD PASS
4110 RO=AN-AI :IF RO<0 THEN RO=RO+360
4120 : IF RO < 70 THEN RO=RO+360
4200 RETURN
4500 REM
4510 REM * CALC. ANGLE *
4530
M(1)=Q(1)+Q(4):M(2)=Q(2)+Q(1):M(3)=
Q(3)+Q(2):M(4)=Q(4)+Q(3)
4540 SUM=(Q(1)+Q(2)+Q(3)+Q(4))/2
4550 : IF M(4) > M(2) THEN 4580
4560 : IF M(3) > =M(1) THEN Q=2 :GOTO4600
4570 Q=1 :GOTO 4600
4580 : IF M(3) > =M(1) THEN Q=3 :GOTO4600
4590 Q=4
4600 ON Q GOTO 4900,4910,4920,4930
4900 AN=(SUM-Q(2)-Q(1))/(Q(3)-Q(1)) *90 :RETURN
4910 AN=(SUM-Q(3)-Q(2))/(Q(4)-Q(2)) *90 +90:RETURN
4920 AN=(SUM-Q(4)-Q(3))/(Q(1)-Q(3)) *90 +180:RETURN
4930 AN=(SUM-Q(1)-Q(4))/(Q(2)-Q(4)) *90 +270:RETURN
5000 REM
```

Steps 4000 through 4500 read the A/D outputs, execute the comparisons for stability and perform the centering calculations. If these are not required in a particular installation, they may be deleted. Steps 4510 through 5000 perform the calculation of the angular representations.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A noncontact shaft angle detector for detecting the angular position of a rotating shaft comprising:
    a patterned disc secured to the shaft for concentric rotation with the shaft, said disc being diametrically bisected into two sectors of different optical properties, the optical property of each sector being substantially uniform, whereby radiant energy directed to said disc will be encoded by the sectored pattern,
    at least three detectors, each of which receives an angular portion of the encoded radiant energy, the portions collectively forming an annular array which is concentric with the shaft, and each of the detectors having an output connection which provides a variable output signal according to the amount of the encoded radiant energy received thereby,
    optical means for directing the encoded radiant energy from said disc to said detectors, and
    analog to digital converting means receiving separate signals from each of said output connections and providing a set of separate digital output signals which together define a unique rotational position of said disc.

2. In a shaft angle detector as defined in claim 1, computing means using said digital output signals from said converting means to calculate the angular position of said disc by comparative analysis of the magnitudes of all of the digital output signals.

3. In a shaft angle detector as defined in claim 1, said sectors being refective surface areas of different reflective properties, a selectively actuatable radiation source located to direct radiation onto the entire area of said disc, and means connected to actuate said radiation source when it is desired to read the position of said disc.

4. A shaft angle detector as defined in claim 3, wherein said radiation source provides radiant energy in a predetermined invisible band of the spectrum.

5. The method of determining the angular position of a rotatable member about its axis of rotation, comprising the steps of:

fixing to the member for concentric rotation therewith a disc with a patterned surface divided into sectors of different radiation attenuating capability, the radiation attenuating capability of each sector being substantially uniform, directing radiant energy of predetermined wavelength onto the surface of the disc, sensing the attenuated radiation from the disc over discrete areas greater in number than the number of the sectors of said disc surface and generating analog signals proportional to the attenuated radiant energy impinging upon each discrete area of sensing, converting each of said analog signals into digital signals, and calculating from said digital signals the angular position of the member.

* * * * *